(12) United States Patent
Funke

(10) Patent No.: US 10,661,360 B2
(45) Date of Patent: May 26, 2020

(54) ROTARY CUTTING TOOL ASSEMBLY

(71) Applicant: Kennametal Inc., Latrobe, PA (US)

(72) Inventor: Frank Funke, Schwelm (DE)

(73) Assignee: KENNAMETAL INC., Latrobe, PA (US)

(*) Notice: Subject to any disclaimer, the term of this patent is extended or adjusted under 35 U.S.C. 154(b) by 0 days.

(21) Appl. No.: 15/905,166

(22) Filed: Feb. 26, 2018

(65) Prior Publication Data

US 2018/0243845 A1 Aug. 30, 2018

(30) Foreign Application Priority Data

Feb. 27, 2017 (DE) .................... 20 2017 101 104 U

(51) Int. Cl.
*B23C 5/10* (2006.01)
*B23B 31/11* (2006.01)
(Continued)

(52) U.S. Cl.
CPC .............. *B23C 5/109* (2013.01); *B23B 27/16* (2013.01); *B23B 31/005* (2013.01); *B23B 31/11* (2013.01); *B23C 5/10* (2013.01); *B23B 2231/0204* (2013.01); *B23B 2231/24* (2013.01); *B23B 2251/02* (2013.01); *B23B 2260/138* (2013.01);
(Continued)

(58) Field of Classification Search
CPC ................. Y10T 279/16; Y10T 407/19; Y10T 407/1932; Y10T 408/907; Y10T 408/94; Y10T 408/95; Y10T 408/957; Y10T 409/309408; B23B 2251/02; B23C 2210/02

USPC ......... 409/234; 408/226, 238, 239 A, 239 R; 407/30, 46; 279/8
See application file for complete search history.

(56) References Cited

U.S. PATENT DOCUMENTS

| | | | | |
|---|---|---|---|---|
| 1,407,335 A | * | 2/1922 | Reynolds | ............ B23B 31/1107 279/100 |
| 4,548,431 A | * | 10/1985 | Hall | ...................... E21B 17/042 285/334 |

(Continued)

FOREIGN PATENT DOCUMENTS

WO  WO-2015058881 A1 * 4/2015 ............... B23C 5/10

OTHER PUBLICATIONS

Excerpt from JIS B0401, "Description of Fits/Graphical Representation of Standard Fits", p. 1835. (Year: 1999).*

*Primary Examiner* — Erica E Cadugan
*Assistant Examiner* — Michael Vitale
(74) *Attorney, Agent, or Firm* — Larry R. Meenan

(57) ABSTRACT

The present invention relates to a rotary cutting tool assembly comprising a toolholder which has a central tool holding receptacle, and a cutting tool which has a holding projection that can be detachably held in the tool holding receptacle and via which the cutting tool is secured to and radially centered on the tool, wherein the holding projection has at its free end a pin-like, first centering section and an adjoining externally threaded section, wherein the holding projection ends in a radially outwardly projecting shoulder having an end face abutment surface, and the tool holding receptacle has an internally threaded section for receiving the externally threaded section and a first centering seat section which is positioned deeper within the tool holding receptacle and in which the centering section of the cutting tool is held.

19 Claims, 2 Drawing Sheets

(51) Int. Cl.
  *B23C 5/28* (2006.01)
  *B23B 31/00* (2006.01)
  *B23B 27/16* (2006.01)

(52) U.S. Cl.
  CPC .......... *B23C 5/28* (2013.01); *B23C 2210/02* (2013.01); *B23C 2240/32* (2013.01); *Y10T 279/16* (2015.01); *Y10T 279/17931* (2015.01); *Y10T 407/14* (2015.01); *Y10T 407/1932* (2015.01); *Y10T 408/907* (2015.01); *Y10T 408/94* (2015.01); *Y10T 408/957* (2015.01); *Y10T 409/30952* (2015.01); *Y10T 409/304032* (2015.01); *Y10T 409/309408* (2015.01)

(56) References Cited

U.S. PATENT DOCUMENTS

| | | | |
|---|---|---|---|
| 5,114,286 A | | 5/1992 | Calkins |
| 5,492,375 A | * | 2/1996 | Smith .................. E21B 17/042 285/334 |
| 8,956,091 B2 | * | 2/2015 | Nonaka .................. B23B 31/11 408/233 |
| 2007/0071560 A1 | * | 3/2007 | Karonen ................ B23B 27/16 407/34 |
| 2012/0093602 A1 | * | 4/2012 | Osawa .................. B23B 31/005 408/239 R |
| 2013/0051935 A1 | * | 2/2013 | Schuffenhauer .... B23B 31/1107 407/34 |
| 2017/0014917 A1 | * | 1/2017 | Chang .................. B23B 31/005 |

* cited by examiner

ROTARY CUTTING TOOL ASSEMBLY

RELATED APPLICATION DATA

The present application claims priority pursuant to 35 U.S.C. § 119(a) to German Patent Application Number DE202017101104.6 filed Feb. 27, 2017 which is incorporated herein by reference in its entirety.

SUMMARY

The invention relates to a rotary cutting tool assembly comprising a toolholder which has a central tool holding receptacle, and a cutting tool which has a holding projection that can be detachably held in the tool holding receptacle and via which the cutting tool is secured to and radially centered on the tool, wherein the holding projection has at its free end a pin-like, first centering section and an adjoining externally threaded section, wherein the holding projection ends in a radially outwardly projecting shoulder having an end face abutment surface, and the tool holding receptacle has an internally threaded section for receiving the externally threaded section and a first centering seat section which is positioned deeper within the tool holding receptacle and in which the centering section of the cutting tool is held.

Such rotary cutting tool assemblies known in the prior art include, for example, drills or milling cutters, in which the cutting tool can typically have interchangeable cutting inserts. Furthermore, there can also be at least one cutting edge present on the cutting tool itself.

The replacement of the cutting tool has to be done quickly, and, moreover, it is important, especially in the case of long cutting tools, that the forces applied during cutting can be reliably transferred into the toolholder. During the cutting operation, lateral movements, wobbling motions or bending of the cutting tool may occur, which place high demands on the transition between the cutting tool and the toolholder. In addition, it is important to reduce vibrations that can occur when the cutting tool is cutting and rotating. Furthermore, a great amount of rigidity has to be realizable between the toolholder and the cutting tool.

For this reason, long externally threaded sections are provided in the prior art that transition at the free end of the holding projection into the first centering section. At the end of the screwing-in process, the first centering section is inserted into the first centering seat section, thereby centering the cutting tool with respect to the toolholder. In order to further increase the flexural rigidity, a second centering section is usually provided between the outwardly projecting shoulder, which serves as a stop, and the externally threaded section, the second centering section then providing additional stabilization in the lateral direction at the end of the screwing-in process.

The object of the invention is to further improve the known rotary cutting tool assembly in order to achieve greater tilting moments and an improved centering and in order to avoid wobble errors that are caused by a central axis of the cutting tool extending at an angle to the central axis of the tool holding receptacle.

This is achieved in a rotary cutting tool assembly of the aforementioned type by the axial length of the first centering section being greater than the axial distance from the start of the internally threaded section to the start of the first centering seat section.

This special geometric characteristic of an overly long first centering section ensures that, in contrast to the prior art, the first centering section gets into its associated centering seat section before the threads mesh with each other. It has been found in particular in tests that the threads of the prior art already result in a centering before the first centering section gets into its centering seat section. This centering via the external threads is not a perfect centering, because the threads are not designed to create a radial centering. There is thus the danger of a certain misalignment which then cannot be completely evened out by the centering sections. Furthermore, this means that the holding projection of the prior art is already under tension due to these differently centered sections, thereby reducing its load capacity. These disadvantages are overcome by virtue of the fact that now the first centering section already ensures the centering without any influence on the part of the threads, so that the threads correctly center and mesh with each other. In addition, the flexural load capacity is above all significantly increased because the distances of the bearing points that are important for the bending moments, in this case of the first centering section and of the end face abutment surface, are greater than those in the prior art. Hence, this results in improved centering, less or no wobble errors, a greater rigidity, reduced vibrations, and significantly increased bending moments that the assembly according to the invention can absorb compared to the prior art. In tests, a 20% longer service life has resulted compared to previous cutting tools.

A further advantage of the assembly according to the invention is that, if necessary, previously known cutting tools with a short first centering section can also be screwed into the toolholder of the assembly according to the invention. The thread lengths in the cutting tools of the prior art and in the invention are usually the same, as are the fits on the first centering section, so that the shorter first centering section of known cutting tools simply projects less into the longer centering seat section.

Between the externally threaded section and the abutment surface, there may also be a second centering section that has a larger outer diameter than the externally threaded section. In turn, the toolholder has a second centering seat section which fixes the second centering section in place when a cutting tool is held in the toolholder. Thus, the diameter of the holding projection increases from the first centering section via the externally threaded section to the second centering section. The second centering section increases the tilting stability and greatly reduces the wobble error again. Furthermore, the force absorption is achieved not just via the frictional force between the holding projection and the abutment surface at this end of the holding projection.

The axial length of the second centering section should be at most 50%, in particular at most 30%, of the axial length of the externally threaded section, so that the axial length of the holding projection can still be kept within limits despite the long first centering section. In addition, this ensures that the second centering section only comes into contact with its centering seat section at the end of the screwing-in process.

The centering sections and the associated centering seat sections should be designed with an H6/g6 fit. As it turns out, this fit is perfect to ensure centering.

A radial clearance should be present between the internally threaded section and the externally threaded section such that the cutting tool is exclusively centered in the toolholder at least via the first centering seat section. This means, in other words, that by way of the tolerances and dimensions at hand, any centering of the internally threaded section via the externally threaded section (itself) already will be precluded.

The threads are preferably metric threads.

The cutting tool should be radially centered exclusively via the first and second centering seat sections in the toolholder.

When the cutting tool is completely screwed into the toolholder, the end face abutment surface can abut against an end face counter surface of the toolholder. Axial positioning is achieved via this abutment surface and the counter surface and, in addition, forces can be absorbed in the axial direction and tilting and bending moments can be absorbed in the lateral direction.

The cutting tool may be a drilling or milling tool and can possibly hold at least one interchangeable cutting insert.

According to an embodiment of the invention, a cooling channel that ends in the tool holding receptacle is provided in the toolholder. In the cutting tool, a cooling channel is also provided which begins at an end face of the end of the first centering section. Especially if cooling channels are present, the stability of the cutting tool and toolholder is reduced, which is why the measures according to the invention are particularly important in this case.

The axial length of the holding projection is 1.8 to 3 times the outer diameter of the end face abutment surface. As a result, most of the bending and tilting moments are absorbed by the centerings via the first centering section and, preferably, also the second one. Due to the length of the holding projection and the distance of the first centering section from the abutment surface, i.e., due to the high penetration depth of the holding projection into the tool holding receptacle, the rotary cutting tool assembly becomes very rigid in the area of the interface between the toolholder and the cutting tool and transfers vibrations, transverse forces, bending moments and tilting moments via the centering section(s).

Furthermore, the length of the holding projection and the fit or fits in conjunction with the planar abutting of the counter surface against the abutment surface provide an increased metallic seal for the cooling media and cooling lubricants.

Further features and advantages of the invention are derived from the following description and from the following drawings to which reference is made.

DETAILED DESCRIPTION

Figure 1:
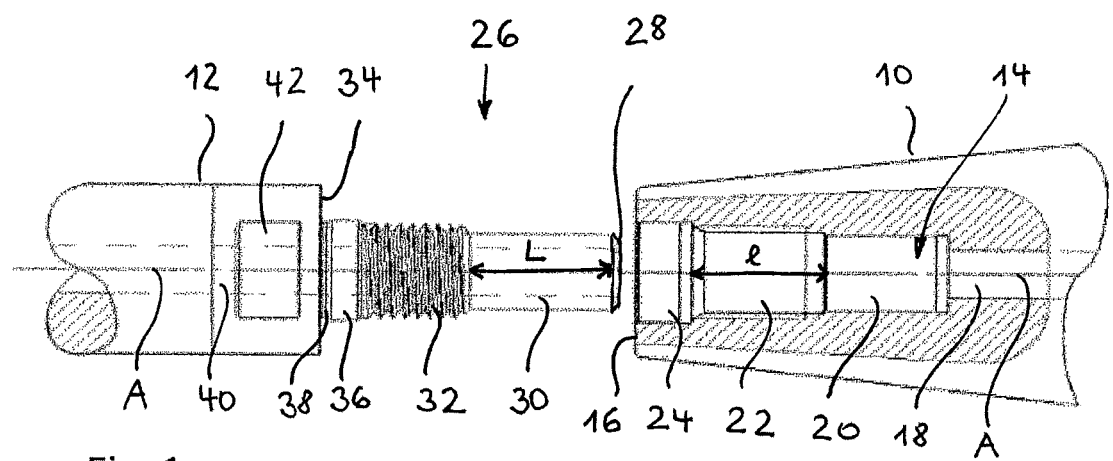
FIG. 1 shows a sectional view through an optional embodiment of the rotary cutting tool assembly according to the invention with a cutting tool not yet screwed into the toolholder.

FIG. 1 shows a rotary cutting tool assembly in the form of a milling cutter or a drill and having a toolholder 10 and a cutting tool 12, which carries at its tip (not shown here) one or more cutting edges and/or one or more interchangeable cutting plates.

The toolholder 10 has a central tool holding receptacle 14 in the form of an opening which starts from a counter surface 16. The central axis A of the tool holding receptacle 14 extends perpendicularly to the counter surface 16. A cooling channel 18, a first centering seat section 20, an adjoining internally threaded section 22 and a thereto adjoining second centering seat section 24 extend centrally to the central axis A.

The first and the second centering seat section 20, 24 extend centrally to the central axis A. The internally threaded section 22 also extends centrally to the axis A, as far as this is possible with the manufacturing accuracy. A centric alignment of the cooling channel 18 may be advantageous but is not mandatory.

On its end opposite to its cutting edges and visible in FIG. 1, the cutting tool 12 has a holding projection 26 with different sections. Starting from the free end 28, a pin-like, first centering section 30 is provided on the holding projection 26, said first centering section being adjoined by an externally threaded section 32. A second centering section 36 is provided between the externally threaded section 32 and an end face abutment surface 34 formed by an outwardly projecting shoulder. A puncture 38 forms the transition between the second centering section 36 and the abutment surface 34. Here, too, the abutment surface 34 extends at a right angle to the central axis A.

The cutting tool 12 also has a central axis A, which constitutes a centering axis as well. This central axis A should be aligned with the central axis A of the toolholder when the two parts are secured to each other. Opposite and diametrically oriented flat surfaces 42 serve as the engagement of a tool with which the cutting tool 12 can be screwed into the toolholder 10.

The threads 22, 32 are designed as metric threads.

The axial length of the second centering section 36 should be at most 50%, in particular at most 30%, of the axial length of the externally threaded section.

The axial length of the holding projection is 1.8 to 3 times the outer diameter of the end face abutment surface.

The securing of the cutting tool 12 in the toolholder 10 will be explained below with reference to FIGS. 2 through 4. It should be emphasized that this securing is a releasable securing that can be reused multiple times without negatively affecting either of the two parts.

Figure 2:
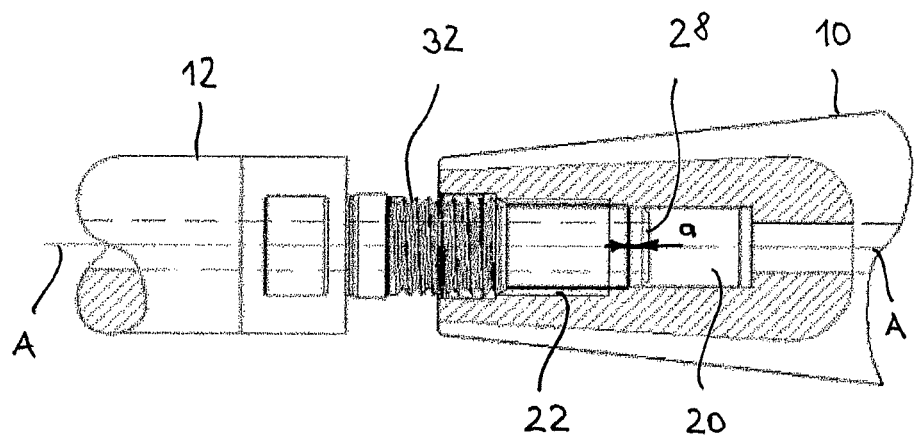
FIG. 2 shows the rotary cutting tool assembly according to FIG. 1 at the beginning of the centering process.

First, still without turning, the cutting tool 12 with the first centering section 30 first is inserted into the tool holding receptacle 14 until the first centering section 30 penetrates into the first centering seat section 20, as shown in FIG. 2. At this time, the externally threaded section 32 is not yet screwed into the internally threaded section 22. This is made possible by the axial length L of the first centering section being greater than the axial distance I of the start of the internally threaded section 22 from the start of the first centering seat section 20, as shown in FIG. 1. If the first centering section 30 has a bevel or rounding at the free end, then the latter is not to be added to the dimensioning of the length L, as FIG. 1 shows. After the insertion of the first centering section 30 into the first centering seat section 20, the cutting tool 12 is already centered in the toolholder 10. The axes A are aligned with each other.

Figure 3:
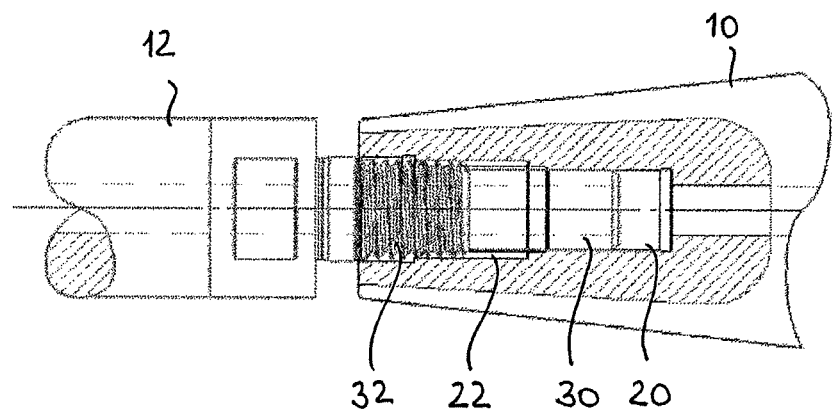
FIG. 3 shows the rotary cutting tool assembly according to the invention of FIG. 1 with partially screwed-in cutting tool.

Subsequently, as shown in FIG. 3, the externally threaded section 32 engages the internally threaded section 22 and is screwed into it. In doing so, the first centering section 30 is inserted deeper and deeper into the first centering seat section 20.

Finally, at the end of the now occurring screwing-in process, the second centering section 36 arrives in the second centering seat section 24 and excludes wobble errors and additionally holds the cutting tool 12 in the toolholder 10.

Figure 4:
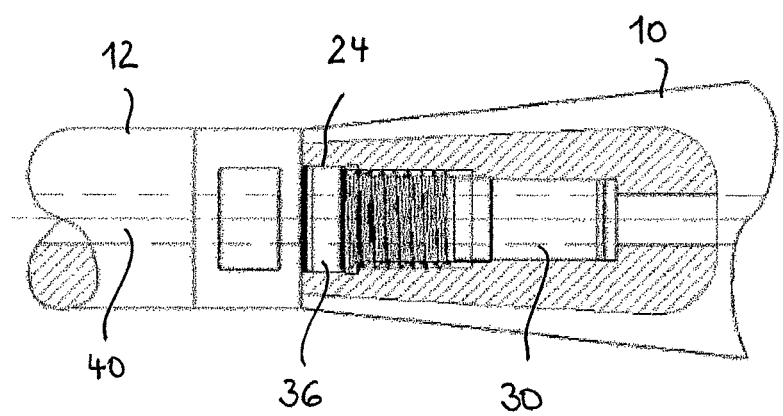
FIG. 4 shows the rotary cutting tool assembly according to the invention with a cutting tool completely held within the toolholder.

This assembly process is completed when the abutment surface 34 abuts against the counter surface 16 during the screwing-in process (see FIG. 4). In the process, an axial press fit is created.

The two centering sections 30, 36 act as widely spaced bearings. As found in tests, the long seat achieved by the first centering section 30 stabilizes the cutting tool in the toolholder very well. This is particularly important in the illustrated exemplary embodiment, because the holding projection 26 is weakened by a cooling channel 40 that begins at the end face of the holding projection, preferably centrally extends through the cutting tool 12 and can align with the cooling channel 18.

Both centering sections 30, 36 and their associated centering seat sections 20, 24 are designed with the same fit, in particular an H6/g6 fit.

The axial length a (see FIG. 2), via which the front end of the first centering section 30 engages in the first centering seat section 20 when the externally threaded section 32 starts to engage the internally threaded section 22, should be at least 20% of the diameter of the first centering section 30 in order to achieve a tilting stability during the first centering.

After installation, the cutting tool 12 is optimally centered in the toolholder 10; the two parts are concentric, without a bending load occurring in the holding projection 26 solely due to the securing of the components to one another. The holding projection is axially strained in elongation between the externally threaded section 32 and the abutment surface 34.

The assembly is characterized by an extreme rigidity, reduced tendency to vibrate and, above all, reduced wobbling motions.

The invention claimed is:

1. A rotary cutting tool assembly comprising:
a toolholder having a central axis and comprising a central tool holding receptacle, the tool holding receptacle including a first centering seat section, an internally threaded section having an axial length (1) that extends between a start of the internally threaded section and a start of the first centering seat section, the internally threaded section adjoining the first centering seat section and a second centering seat section, and
a cutting tool having a central axis and comprising a holding projection detachably held in the tool holding receptacle, the holding projection including a cylindrical-shaped first centering section extending axially from an end face thereof and having an axial length (L), and an externally threaded section adjoining the first centering section, the holding projection further including an end face abutment surface distal the end face and formed by a shoulder projecting radially outward from a second centering section of the cutting tool and the second centering section disposed between the externally threaded section and the end face abutment surface, the second centering section having an outer diameter larger in magnitude than an outer diameter of the externally threaded section,
wherein the axial length (L) of the first centering section of the cutting tool is greater in length than the axial length (1) of the internally threaded section of the toolholder,
wherein an axial length of the holding projection is 1.8 to 3 times larger than an outer diameter of the end face abutment surface, and
wherein the central axis of the cutting tool is aligned with the central axis of the toolholder when the holding projection is received in the tool holding receptacle of the toolholder.

2. The rotary cutting tool assembly according to claim 1, wherein an axial length of the second centering section is at most 50% of an axial length of the externally threaded section.

3. The rotary cutting tool assembly according to claim 1, wherein the first and second centering sections of the cutting tool and the first and second centering seat sections of the toolholder are designed with the same fit.

4. The rotary cutting tool assembly according to claim 1, wherein the central axis of the cutting tool is aligned with the toolholder when the first centering section of the cutting tool is received by the first centering seat section of the toolholder.

5. The rotary cutting tool assembly according to claim 1, wherein the central axis of the cutting tool is aligned with the toolholder when the first and second centering sections of the cutting tool are received by the first and second centering seat sections of the toolholder.

6. The rotary cutting tool assembly according to claim 1, wherein the cutting tool holds at least one interchangeable cutting insert.

7. The rotary cutting tool assembly according to claim 1, wherein:
the toolholder includes a cooling channel that ends in the tool holding receptacle, and
the cutting tool includes a cooling channel that starts at the end face of the first centering section.

8. The rotary cutting tool assembly according to claim 1, where an axial length of the second centering section is at most 30% of an axial length of the externally threaded section.

9. The rotary cutting tool assembly according to claim 1, wherein
the first centering section of the toolholder has a diameter, and
an axial length (a), via which a front end of the first centering section engages in the first centering seat section when the externally threaded section of the cutting tool starts to engage the internally threaded section of the toolholder, is at least 20% of the diameter of the first centering section of the toolholder.

10. The rotary cutting tool assembly according to claim 1, wherein the cutting tool further comprises a puncture formed between the second centering section and the end face abutment surface.

11. A rotary cutting tool assembly comprising:
a cutting tool having a central axis and comprising a holding projection detachably held in the tool holding receptacle, the holding projection including a cylindrical-shaped first centering section extending axially from an end face thereof and having an axial length (L), and an externally threaded section adjoining the first centering section, the holding projection further including an end face abutment surface distal the end face and formed by a shoulder projecting radially outward from a second centering section of the cutting tool, and the second centering section disposed between the externally threaded section and the end face abutment surface; and
a toolholder having a central axis and comprising a central tool holding receptacle, the tool holding receptacle including a first centering seat section capable of receiving the first centering section of the cutting tool, an internally threaded section having an axial length (l) that extends between a start of the internally threaded section and a start of the first centering seat section, the internally threaded section adjoining the first centering seat section, the internally threaded section capable of receiving the externally threaded section of the cutting tool, and a second centering seat section capable of receiving the second centering section of the cutting tool, the second centering section having an outer diameter larger in magnitude than an outer diameter of the externally threaded section, and the second centering seat section adjoining the first centering seat section via the internally threaded section, wherein the axial length (L) of the first centering section of the cutting tool is greater in length than the axial length (l) of the internally threaded section of the toolholder, wherein an axial length of the holding projection is 1.8 to 3 times larger than an outer diameter of the end face abutment surface, and wherein the cutting tool is concentric with the toolholder when the holding projection of the cutting tool is received in the tool holding receptacle of the toolholder.

12. The rotary cutting tool assembly according to claim 11, wherein the second centering section has an outer diameter larger than an outer diameter of the externally threaded section, and wherein the second centering seat section additionally secures the cutting tool in the toolholder.

13. The rotary cutting tool assembly according to claim 11, wherein an axial length of the second centering section is at most 50% of an axial length of the externally threaded section.

14. The rotary cutting tool assembly according to claim 11, wherein the axial length of the second centering section is at most 30% of an axial length of the externally threaded section.

15. The rotary cutting tool assembly according to claim 11, wherein the first and second centering sections and the associated first and second centering seat sections are designed with the same fit.

16. The rotary cutting tool assembly according to claim 11, wherein the central axis of the cutting tool is concentric with the toolholder when the first centering section of the cutting tool is received by the first centering seat section of the toolholder.

17. The rotary cutting tool assembly according to claim 11, wherein the central axis of the cutting tool is concentric with the toolholder when the first and second centering sections of the cutting tool are received by the first and second centering seat sections of the toolholder.

18. The rotary cutting tool assembly according to claim 11, wherein the cutting tool holds at least one interchangeable cutting insert.

19. The rotary cutting tool assembly according to claim 11, wherein the first centering section of the toolholder has a diameter, and an axial length (a), via which a front end of the first centering section engages in the first centering seat section when the externally threaded section of the cutting tool starts to engage the internally threaded section of the toolholder, is at least 20% of the diameter of the first centering section of the toolholder.

\* \* \* \* \*